US008503425B2

(12) United States Patent
Chung et al.

(10) Patent No.: US 8,503,425 B2
(45) Date of Patent: Aug. 6, 2013

(54) METHOD FOR ALLOCATING PHICH AND GENERATING REFERENCE SIGNAL IN SYSTEM USING SINGLE-USER MIMO BASED ON MULTIPLE CODEWORDS WHEN TRANSMITTING UPLINK

(75) Inventors: Jae Hoon Chung, Anyang-si (KR); So Yeon Kim, Anyang-si (KR); Yeong Hyeon Kwon, Anyang-si (KR); Hyun Soo Ko, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 13/055,390

(22) PCT Filed: Jul. 22, 2009

(86) PCT No.: PCT/KR2009/004065
§ 371 (c)(1),
(2), (4) Date: Apr. 5, 2011

(87) PCT Pub. No.: WO2010/011083
PCT Pub. Date: Jan. 28, 2010

(65) Prior Publication Data
US 2011/0176502 A1    Jul. 21, 2011

Related U.S. Application Data

(60) Provisional application No. 61/082,827, filed on Jul. 22, 2008, provisional application No. 61/157,525, filed on Mar. 4, 2009.

(51) Int. Cl.
*H04J 3/24* (2006.01)
(52) U.S. Cl.
USPC ............................................ 370/349; 370/471

(58) Field of Classification Search
USPC .............. 370/349, 208, 203, 339, 314, 310.2, 370/322, 328, 347
See application file for complete search history.

(56) References Cited

U.S. PATENT DOCUMENTS
2008/0318608 A1* 12/2008 Inoue et al. ................... 455/509

FOREIGN PATENT DOCUMENTS
CN        101005477          7/2007
WO     WO 2007/133860 A2    11/2007

OTHER PUBLICATIONS

InterDigital Communications Corportation, Summary of Uplink SU-MIMO Using Precoding[online], 3GPP TSG-RAN WG1#47 R1-063464, Nov. 6, 2006.

(Continued)

*Primary Examiner* — Brenda H Pham
(74) *Attorney, Agent, or Firm* — McKenna Long & Aldridge, LLP

(57) ABSTRACT

The present invention relates to a method for generating an uplink reference signal in a system supporting plural uplink-access transmission modes. The method comprises: a step for transmitting the reference signal configuration information about the configuration of a reference signal from a base station to a user device through an uplink grant PDCCH (Physical Downlink Control Channel), and a step for receiving from the user device a sub-frame including the reference signal that is generated based on the reference signal configuration information. The reference signal configuration information is prepared for plural uplink access transmission modes and includes a cyclic shift value for the sequence of the reference signal. The reference signal is supposed to be transmitted to an uplink, and the user device is set up to be operated in the uplink-access transmission mode that corresponding to the reference signal configuration information.

6 Claims, 9 Drawing Sheets

OTHER PUBLICATIONS

NEC Group, The Detail of ZC Sequence Planning for Uplink Reference Signal[online], 3GPP TSG-RAN WG1#49b R1-072825, Jun. 25, 2007.

NEC Group, NTT DoCoMo, Discussion on Uplink Reference Signal[online], 3GPP TSG-RAN WG1 #49b R1-072824, Jun. 25, 2007.

Qualcomm Europe, UL RS structure Issues with Frequency Domain CDM[online], 3GPP TSG-RAN WG1#47bis R1-070432.

NTT DoCoMo, NEC, SHARP, Orthogonal Pilot Channel in the Same Node B in Evolved UTRA Uplink[online], 3GPP TSG-RAN WG1#42 R1-050851, Aug. 29, 2005.

Ericsson: "Uplink reference signals", TSG-RAN WG1 #47, Riga, Latvia, Nov. 6-10, 2006, R1-063128.

NTT DoCoMo, Ericsson, Mitsubishi Electric NEC: "Sequence Hopping and Cyclic-Shift Value Hopping for Uplink Reference Signal in E-UTRA", 3GPP TSG RAN WG1 Meeting #48bis, St. Julians, Malta, Mar. 26-30, 2007, R1-071643.

Nokia and Nokia Siemens Networks: "UL demodulation reference signal for EUTRA TDD type 2 frame structure", 3GPP TSG RAN WG1 Meeting #49, Kobe, Japan, May 7-11, 2007, R1-072297.

Nokia Siemens Networks, Nokia UL DM RS for Multi-bandwidth Multi-user MIMO, 3GPP TSG RAN WG1 Meeting #51 R1-074865, Nov. 5-9, 2007, All Pages.

Nokia Siemens Networks, Nokia Cyclic shift value definition for PUSCH demodulation RS, 3GPP TSG RAN WG1 Meeting #52bis R1-081444 Mar. 31-Apr. 4, 2008, All Pages.

* cited by examiner

Spatial Multiplexing

Spatial Division Multiple Access

METHOD FOR ALLOCATING PHICH AND GENERATING REFERENCE SIGNAL IN SYSTEM USING SINGLE-USER MIMO BASED ON MULTIPLE CODEWORDS WHEN TRANSMITTING UPLINK

This application is a National Stage Entry of International Application No. PCT/KR2009/004065, filed Jul. 22, 2009, and claims the benefit of U.S. Provisional Application No. 61/082,827, filed Jul. 22, 2008 and U.S. Provisional Application No. 61/157,525, filed Mar. 4, 2009, all of which are hereby incorporated by reference in their entirety herein.

BACKGROUND OF THE INVENTION

1. Field of the Invention

The present invention relates to a mobile communication technology and an uplink transmission control method, and more particularly, to a method for allocating a Physical Hybrid Automatic Repeat Request Indicator Channel (PHICH) and generating a reference signal in a system using Single-User Multiple Input Multiple Output (SU-MIMO) based on multiple codewords upon uplink transmission.

2. Discussion of the Related Art

In a mobile communication system, a user equipment (UE) may receive information from a base station (BS) in downlink and transmit information in uplink. The information transmitted or received by the UE includes data and a variety of control information, and a physical channel varies according to the type of information transmitted or received by the UE.

FIG. 1 is a view showing physical channels used for a 3$^{rd}$ Generation Partnership Project (3GPP) Long Term Evolution (LTE) system, which is an example of a mobile communication system, and a general signal transmission method using the same.

When a UE is powered on or when the UE newly enters a cell, the UE performs an initial cell search operation such as synchronization with a BS in step S101. In order to perform the initial cell search, the UE may receive a Primary Synchronization Channel (P-SCH) and a Secondary Synchronization Channel (S-SCH) from the BS so as to perform synchronization with the BS, and acquire information such as a cell ID. Thereafter, the UE may receive a physical broadcast channel from the BS and acquire broadcast information in the cell. Meanwhile, the UE may receive a Downlink Reference signal (DL RS) in the initial cell search step and confirm a downlink channel state.

The UE, upon completes the initial cell search, may receive a Physical Downlink Control Channel (PDCCH) and a Physical Downlink Shared Channel (PDSCH) corresponding to the PDCCH, and acquire more detailed system information in step S102.

Meanwhile, if the UE does not complete access to the BS, the UE may perform a random access procedure in steps S103 to S106, in order to complete access to the BS. In order to perform a random access procedure, the UE may transmit a feature sequence via a Physical Random Access Channel (PRACH) as a preamble (S103), and may receive a response message to the random access procedure via the PDCCH and the PDSCH corresponding thereto (S104). In contention-based random access, except for handover, a contention resolution procedure including transmission of an additional PRACH (S105) and reception of the PDCCH and the PDSCH corresponding thereto (S106) may be performed.

The UE, having performed the above-described procedure, may then receive the PDCCH/PDSCH (S107) and transmit a Physical Uplink Shared Channel (PUSCH)/Physical Uplink Control Channel (PUCCH) (S108), as a general uplink/downlink signal transmission procedure.

FIG. 2 is a view explaining a signal processing procedure for enabling a UE to transmit an uplink signal.

In order to transmit the uplink signal, a scrambling module 210 of the UE may scramble a transmitted signal using a UE-specific scrambling signal. The scrambled signal is input to a modulation mapper 220 so as to be modulated into complex symbols using Binary Phase Shift Keying (BPSK), Quadrature Phase Shift Keying (QPSK) or 16-Quadrature amplitude modulation (QAM) according to the kind of the transmitted signal and/or the channel state. Thereafter, the modulated complex symbols are processed by a transform precoder 230, and the processed complex symbols are input to a resource element mapper 240. The resource element mapper 240 may map the complex symbols to time-frequency resource elements used for actual transmission. The signal processed as described above may be transmitted to a BS via an SC-FDMA signal generator 250 and an antenna.

FIG. 3 is a view explaining a signal processing procedure for enabling a BS to transmit a downlink signal.

In the 3GPP LTE system, the BS may transmit one or more codewords in downlink. Accordingly, one or more codewords may be processed by scrambling modules 301 and modulation mappers 302 to configure complex symbols, similar to the uplink transmission of FIG. 2. Thereafter, the complex symbols are mapped to a plurality of layers by a layer mapper 303, and each layer may be multiplied by a predetermined precoding matrix, which is selected according to the channel state, by a precoding module 304 and may be allocated to each transmission antenna. The processed signals which will respectively be transmitted via antennas may be mapped to time-frequency resource elements used for transmission by resource element mappers 305, and may respectively be transmitted via OFDM signal generators 306 and antennas.

In a mobile communication system, in a case where a UE transmits a signal in uplink, a Peak-to-Average Ratio may be more problematic than the case where a BS transmits a signal in downlink. Accordingly, as described above with reference to FIGS. 2 and 3, downlink signal transmission uses an OFDMA scheme, while uplink signal transmission uses an SC-FDMA scheme.

FIG. 4 is a diagram explaining an SC-FDMA scheme for uplink signal transmission and an OFDMA scheme for downlink signal transmission in a mobile communication system.

A UE for uplink signal transmission and a BS for downlink signal transmission are identical in that a serial-to-parallel converter 401, a subcarrier mapper 403, an M-point Inverse Discrete Fourier Transform (IDFT) (or IFFT) module 404 and a Cyclic Prefix (CP) adding module 406 are included.

The UE for transmitting a signal using an SC-FDMA scheme further includes a parallel-to-serial converter 405 and an N-point DFT module 402. The N-point DFT module 402 performs mapping to contiguous input points in an input unit of IDFT and partially offsets an IDFT (or IFFT) process influence of the M-point IDFT (or IFFT) module 404 such that the transmitted signal has a single carrier property.

A channel for transmitting ACKnowledgement (ACK)/Negative ACKnowledgement (NACK) for uplink data transmission (Physical Uplink Shared CHannel (PUSCH)) in downlink is referred to as a Physical Hybrid Automatic Repeat Request Indicator CHannel (PHICH) in a 3GPP LTE system. FIG. 5 is a diagram illustrating a process of transmitting a PHICH in a 3GPP LTE system.

Since an LTE system does not use SU-MIMO in uplink, only 1-bit ACK/NACK for PUSCH transmission of one UE, that is, a single data stream or codeword, is transmitted through a PHICH. The 1-bit ACK/NACK is encoded into 3 bits using repetition coding with a code rate of 1/3 (step 501), and three modulation symbols are generated using Binary Phase Shift Keying (BPSK) (step 502). The modulation symbols are spread using a Spreading Factor (SF) of 4 in the case of normal cyclic prefix and are spread using an SF of 2 in the case of extended cyclic prefix (step 503). The number of orthogonal sequences used for spreading becomes SF*2 in terms of In-phase/Quadrature (I/Q) multiplexing concept. Accordingly, SF*2 PHICHs spread using SF*2 orthogonal sequences are defined as one PHICH group and PHICH groups located in a certain subframe are layer-mapped (step 504), precoded, resource-mapped (step 505), and then transmitted.

In a method for allocating downlink PHICH channel resources of a cell, or a BS or a relay node to uplink data transmission of certain user equipments or relay nodes, using a computation process using a lowest Physical Resource Block (PRB) index of one or more PRBs used for transmission of a PUSCH and a cyclic shift value set as resources for a Demodulation Reference Signal (DM-RS) used for the channel transmission, a PHICH group index used for transmission out of all PHICH groups and a PHICH channel index within the PHICH group are derived, and PHICH channels which will be transmitted to the certain UEs or relay nodes are allocated using these indexes. A MIMO scheme may remarkably increase system capacity by simultaneously and spatially transmitting several data streams (or codewords) using two or more transmission and reception antennas at a BS and a terminal and may obtain transmit diversity gain or beamforming gain using several transmission antennas. In a transmit diversity scheme, since the same data information is transmitted through several transmission antennas, it is possible to perform data transmission with high reliability in a channel state which is rapidly changed with time and to perform data transmission without feedback information associated with a channel. Beamforming is used to increase a Signal to Interference plus Noise Ratio (SINR) of a receiver by applying respective adequate weights to several transmission antennas. In general, in a Frequency Division Duplexing (FDD) system, since uplink and downlink channels are independent, high reliability channel information is necessary to obtain appropriate beamforming gain. Accordingly, separate feedback is received and used from the receiver.

FIG. 6 is a diagram illustrating Spatial Multiplexing (SM) and Spatial Division Multiple Access (SDMA). SM for a single user is referred to as SM or SU-MIMO. Channel capacity of a MIMO system increases in proportion to a minimum value among the numbers of transmission/reception antennas. SM for multiple users is referred to as Spatial Division Multiple Access (SDMA) or Multi-User MIMO (MU-MIMO).

When using the MIMO scheme, there are a Single CodeWord (SCW) scheme for simultaneously transmitting N data streams using one channel encoding block and a Multiple CodeWord (MCW) scheme for transmitting N data streams using M (M is always equal to or less than N) channel encoding blocks. Each channel encoding block generates an independent codeword and each codeword is designed for independent error detection.

FIG. 7 is a diagram showing the structure of a transmitter of a MIMO system using a MCW scheme. In detail, M data packets are subjected to encoding (e.g., turbo encoding of FIG. 7) and modulation (e.g., QAM modulation of FIG. 7) so as to generate M codewords, and each codeword has an independent HARQ process block. The M modulated data symbols are simultaneously encoded in a MIMO stage according to a multi-antenna scheme and are transmitted through respective physical antennas. Thereafter, a receiver feeds back a multi-antenna channel state as channel quality information so as to control an SM rate, a coding rate and a modulation scheme. In this case, additional control information is necessary.

A mapping relationship between codewords and physical antennas has a certain format.

FIG. 8 is a diagram showing an example of a mapping relationship between codewords and physical antennas. Specifically, FIG. 8 shows codeword-to-layer mapping for SM rate in downlink (DL) of 3GPP TS 36.211. As shown in FIG. 8, if SM rate (that is, rank) is 1, one codeword is mapped to one layer, data of one layer is encoded using a precoding scheme so as to be transmitted through four transmission antennas. If SM rate is 2, two codewords are mapped to two layers and are mapped to four antennas by a precoder.

If SM rate is 3, one of two codewords is mapped to two layers by a serial-parallel (S/P) converter, two codewords are mapped to three layers and is mapped to four antennas by a precoder. If an SM rate is 4, two codewords are mapped to two layers by an S/P converter and a total of four layers is mapped to four antennas by a precoder. That is, in the case of a BS having four transmission antennas, a maximum of four layers may be used and four independent codewords may be used. However, in FIG. 8, the number of codewords is a maximum of two. Accordingly, in the system shown in FIG. 8, if each codeword CW has an independent HARQ process, a maximum of two independent HARQ processes may be used.

Currently, in the LTE system, on the assumption that a single RF and a power amplifier chain are used in PUSCH transmission, since channel assignment of a downlink PHICH to a PUSCH is designed based on 1-bit ACK/NACK per UE, there is a need for improvement in channel capacity and assignment method in consideration of SU-MIMO based on multiple codewords in PUSCH transmission.

SUMMARY OF THE INVENTION

Accordingly, the present invention is directed to a method for allocating a Physical Hybrid Automatic Repeat Request Indicator CHannel (PHICH) and generating a reference signal in a system using Single-User Multiple Input Multiple Output (SU-MIMO) based on multiple codewords upon uplink transmission that substantially obviates one or more problems due to limitations and disadvantages of the related art.

An object of the present invention is to provide a method for transmitting a downlink PHICH of control information for applying a MIMO scheme based on multiple access schemes other than Single Carrier-Frequency Division Multiple Access (SC-FDMA) in uplink data transmission and methods for defining and representing control information transmitted in a state of being included in an uplink grant PDCCH including transmission information specified by a cell, a base station or a relay node in downlink, which includes cyclic shift as resources of Demodulation Reference Signals (DM-RSs) divided on a per antenna (physical antenna or virtual antenna) or transmission layer basis upon uplink transmission.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of generating an uplink reference signal in a Single-User Multiple Input Multiple Output (SU-MIMO) system for transmitting one or more codewords in uplink includes, transmitting, at a base station, reference signal configuration information indicating the configuration of reference signals to be transmitted in uplink to a user equipment through a uplink grant Physical Downlink Control Channel (PDCCH), wherein the user equipment is set to operate according to an uplink access mode corresponding to the information; and receiving a subframe including the reference signals generated based on the reference signal configuration information from the user equipment. The reference signal configuration information includes cyclic shift values of sequences of the reference signals.

The reference signal configuration information may include information about cyclic shifts of N (N≦M) reference signals among all M reference signals to be transmitted in uplink, and the information includes cyclic shift index of a reference signal used as a criterion among the N reference signals and offset information for determining cyclic shift indexes of remaining N−1 reference signals.

The value M may be determined according to a number of physical transmission antennas, physical transmission antennas or transmission layers of a subframe configured in the user equipment.

The reference signal configuration information may include cyclic shift indexes of N (N≦M) reference signals among all M reference signals to be transmitted in uplink.

The N reference signals may be Constant Amplitude Zero Autocorrelaton (CAZAC) reference signals.

The N reference signals of the M reference signals may be inserted at predetermined symbol positions of a time domain and are subjected to a Discrete Fourier Transform (DFT) process.

The N reference signals of the M reference signals are directly mapped to sample points corresponding to an allocated frequency transmission band at an input end of Inverse Discrete Fourier Transform (IDFT) or Inverse Fast Fourier Transform (IFFT).

In another aspect of the present invention, a method of allocating a Physical Hybrid Automatic Repeat Request Indicator Channel (PHICH) for transmitting ACKnoledgement/Negative ACKnowledgement (ACK/NACK) with respect to each transmitted codeword in a Single-User Multiple Input Multiple Output (SU-MIMO) system for transmitting one or more codewords in uplink includes determining a number of PHICH groups, and determining a PHICH group index and an orthogonal sequence index within the PHICH group using the number of PHICH groups. The number of PHICH groups is determined using a maximum number of codewords upon uplink transmission.

The PHICH group index and the orthogonal sequence index within the PHICH group may be determined using a function for providing a unique offset value of each codeword.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
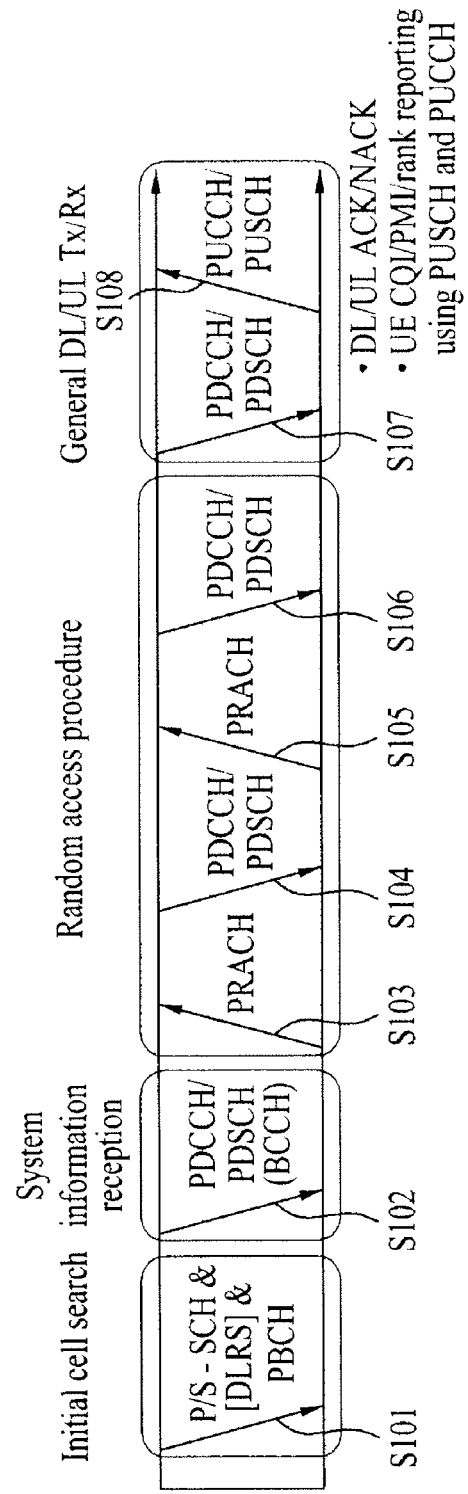
FIG. 1 is a view showing physical channels used for a $3^{rd}$ Generation Partnership Project (3GPP) Long Term Evolution (LTE) system, which is an example of a mobile communication system, and a general signal transmission method using the same.
Figure 2:
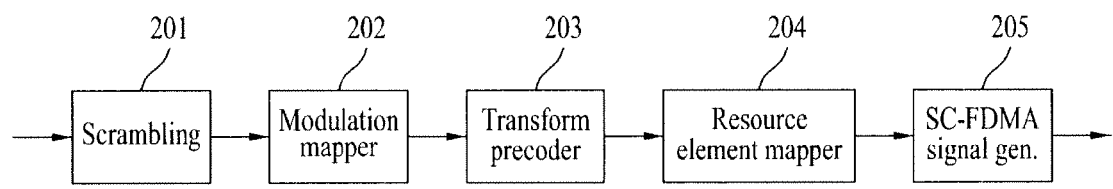
FIG. 2 is a view explaining a signal processing procedure in which a User Equipment (UE) transmits an uplink signal.
Figure 3:
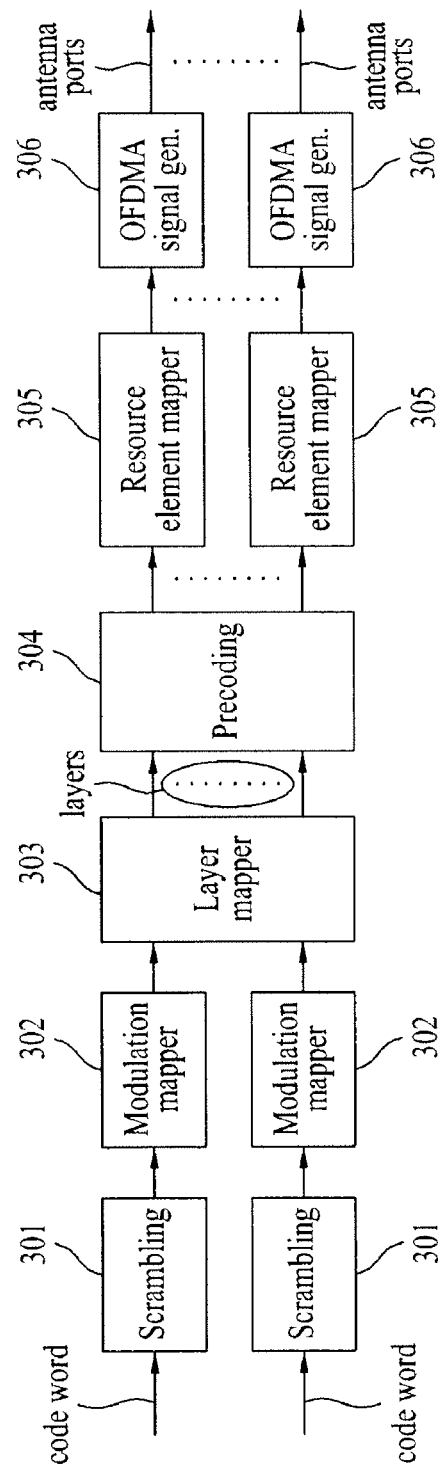
FIG. 3 is a view explaining a signal processing procedure in which a Base Station (BS) transmits a downlink signal.
Figure 4:
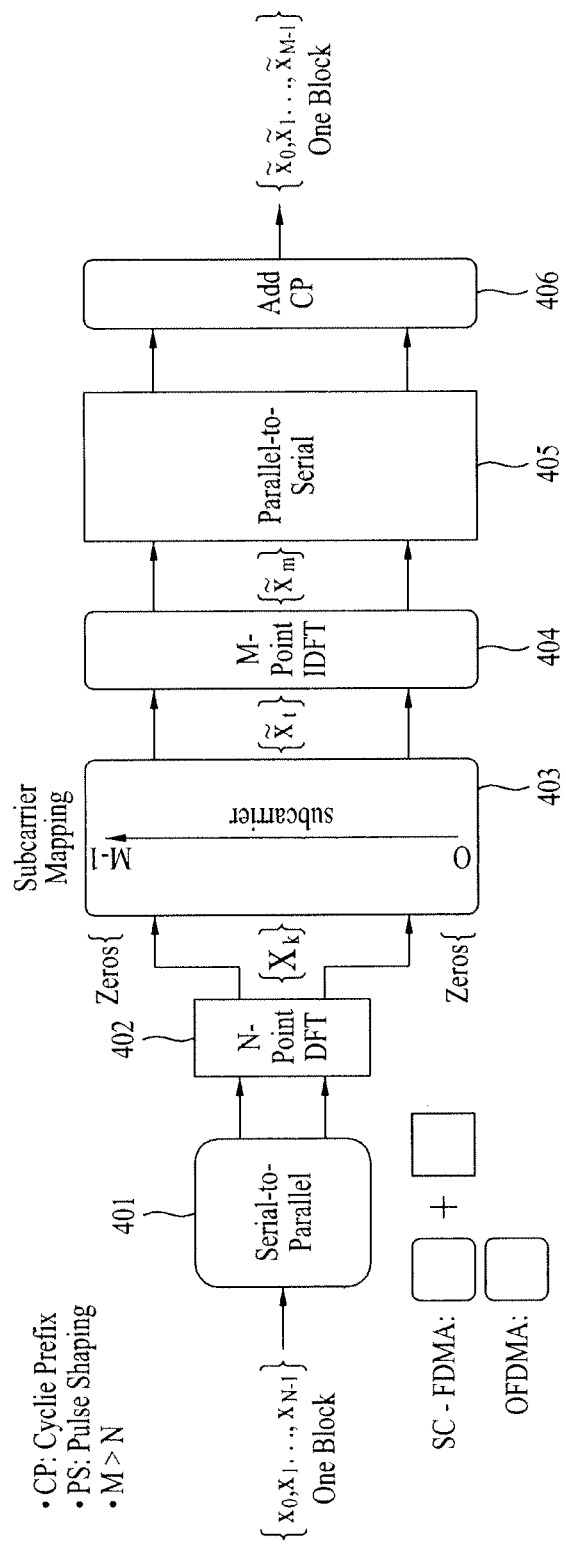
FIG. 4 is a diagram explaining an SC-FDMA scheme for uplink signal transmission and an OFDMA scheme for downlink signal transmission in a mobile communication system.
Figure 5:
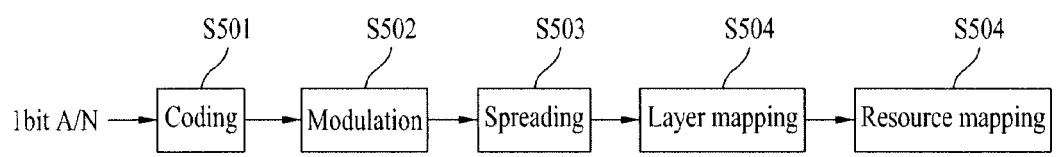
FIG. 5 is a diagram a process of transmitting a PHICH in a 3GPP LTE system.
Figure 6:
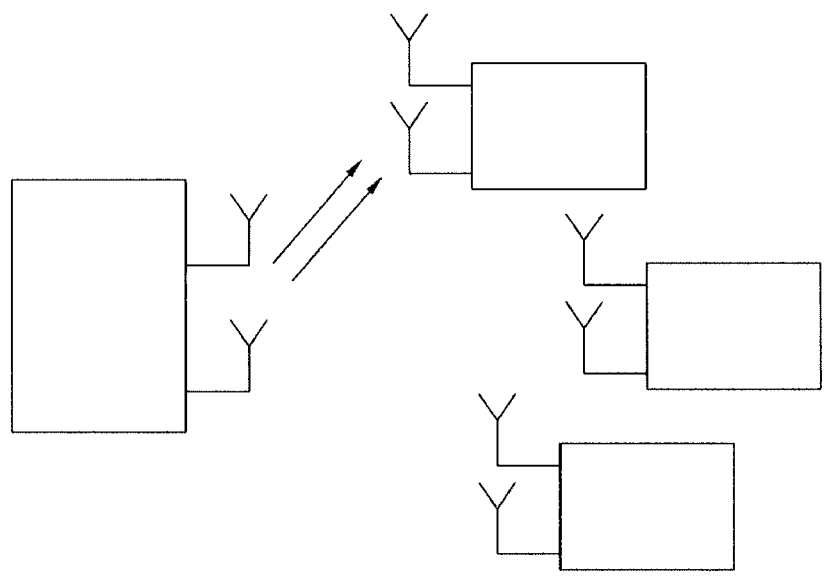
FIG. 6 is a diagram illustrating Spatial Multiplexing (SM) and Spatial Division Multiple Access (SDMA)
Figure 6:
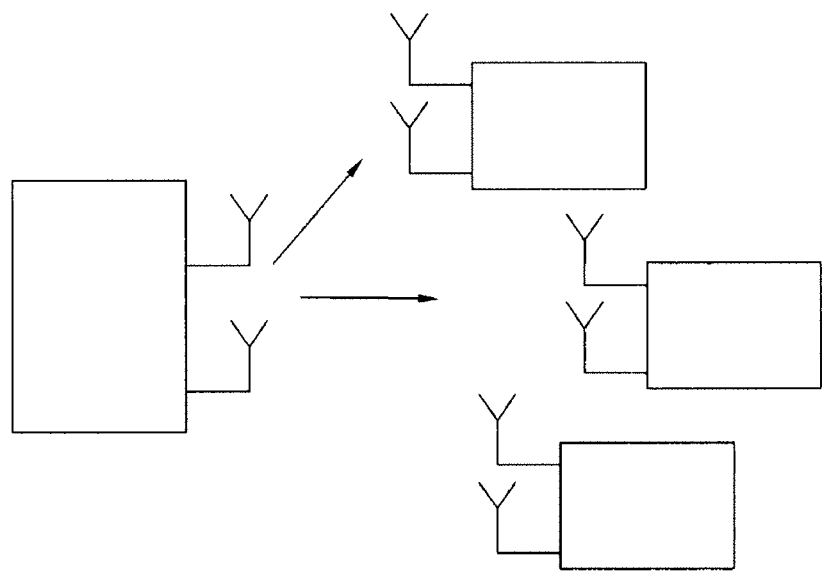
Figure 7:
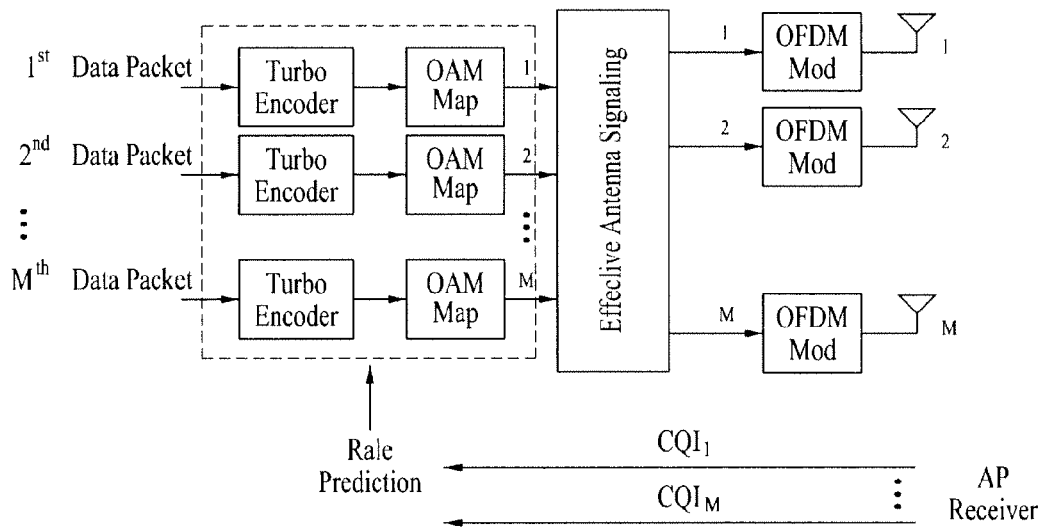
FIG. 7 is a diagram showing the structure of a transmitter of a MIMO system utilizing an MCW scheme.
Figure 8:
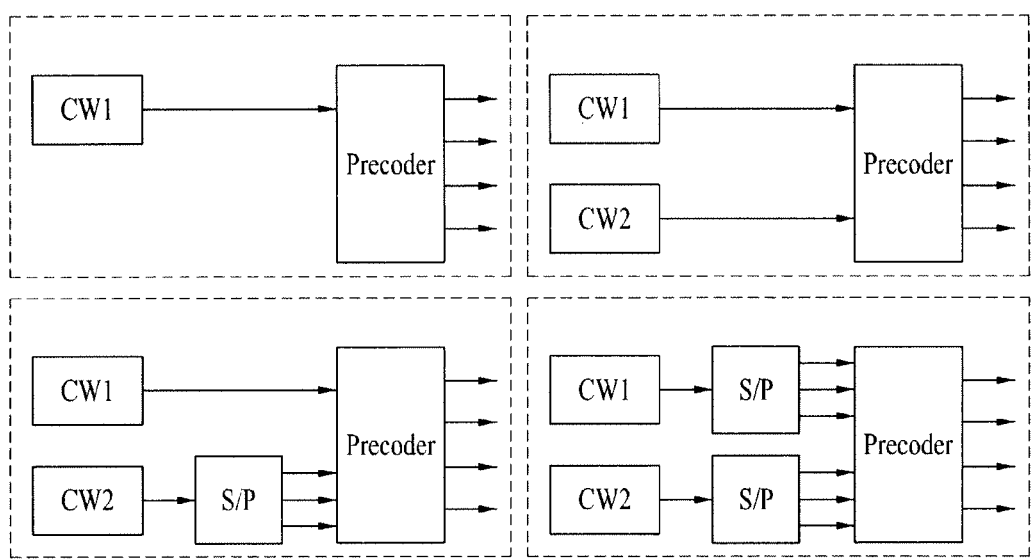
FIG. 8 is a diagram showing an example of a mapping relationship between codewords and physical antennas.

Hereinafter, the embodiments of the present invention will be described in detail with reference to the accompanying drawings so as to be easily implemented by those skilled in the art. However, the present invention may be variously implemented and is not limited to the embodiments described herein. In the drawings, in order to clearly describe the present invention, portions which are not related to the description of the present invention will be omitted and similar portions are denoted by similar reference numerals throughout the specification.

Throughout the specification, when a certain portion "includes" a certain component, this does not mea that other components are excluded and other components may be included otherwise noted. The terms "unit", "-or/er" and "module" as used in the specification indicate a unit for processing at least one function or operation, which may be implemented by hardware, software or a combination thereof.

Figure 9:
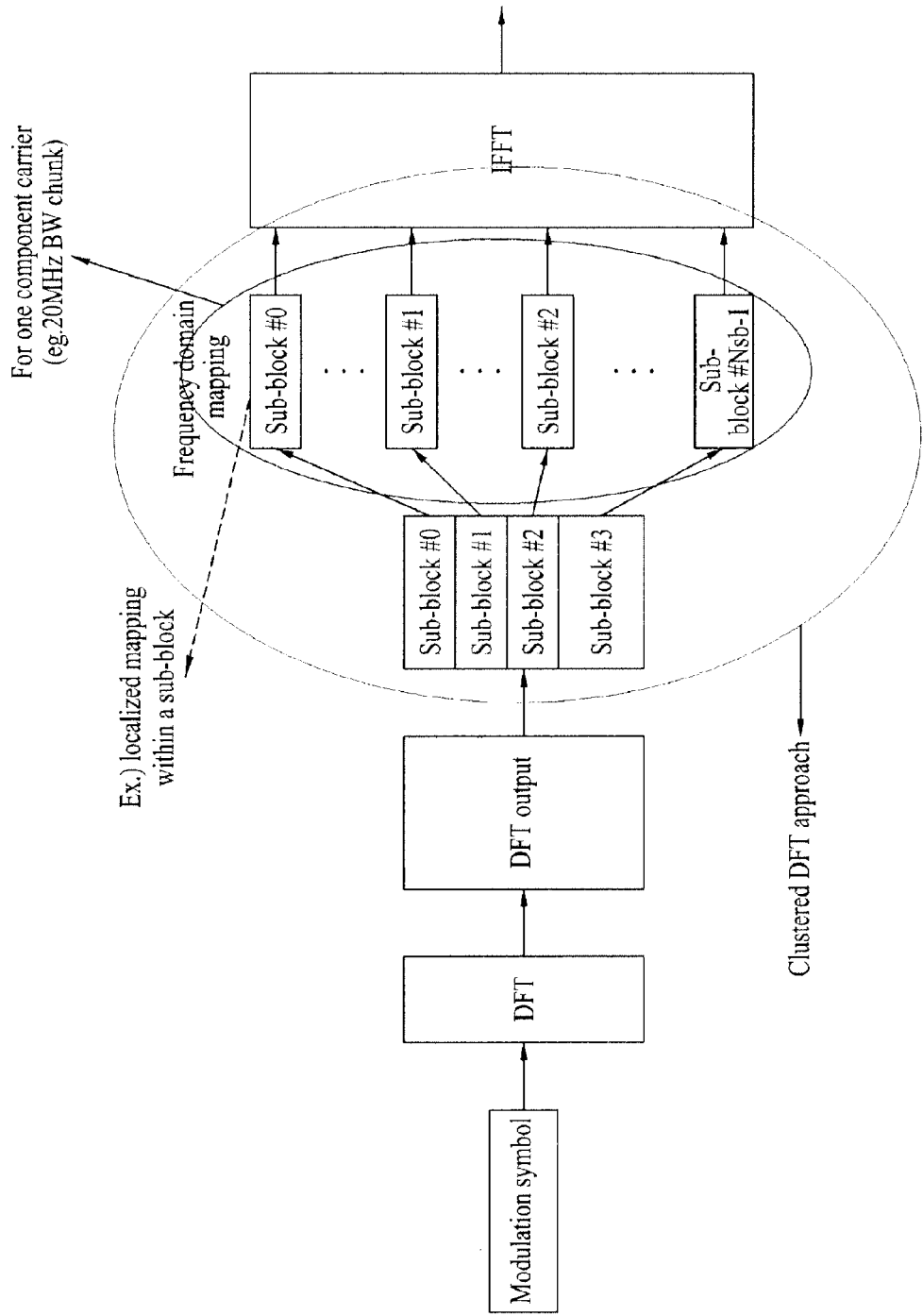
FIG. 9 is a diagram showing a signal processing method in which DFT process output samples are mapped to a single carrier in clustered SC-FDMA.

In an LTE-Advanced (LTE-A) system, clustered SC-FDMA (or DFT-s-OFDMA (DFT spread OFDMA)) may be applied to conventional SC-FDMA as an uplink multiple access scheme added to an SC-FDMA scheme. FIG. 9 is a diagram showing a signal processing method in which DFT process output samples are mapped to a single carrier in a clustered SC-FDMA scheme. As shown in FIG. 9, the clustered SC-FDMA scheme is different from the SC-FDMA scheme in that N-point samples of an output unit of an N-point DFT module are divided into clusters, that is, L sample groups, and the sample groups are separately mapped to an M-point IDFT (or IFFT) input unit. To this end, a Cubic Metric (CM) or a Peak to Average Power Ratio (PAPR) of a transmitted signal is increased, but is remarkably less than that of the OFDMA scheme. In addition, uplink scheduling flexibility can be increased and an uplink transfer rate can be increased. In uplink of the LTE-A system, a certain user equipment may adaptively select any one of the SC-FDMA scheme and the clustered SC-FDMA scheme using a certain method, depending on whether there is room for transmit power as compared with maximum transmit power, thereby performing uplink transmission.

Accordingly, the system described in the present invention may support an uplink multiple access scheme. Hereinafter, the present invention will be described on the assumption that a clustered SC-FDMA scheme is used as an uplink multiple access scheme applied to the SC-FDMA scheme.

In the present invention, a method of designing an ACK/NACK channel (hereinafter, referred to as a Physical HARQ Indication Channel (PHICH)) transmitted in downlink in an uplink multiple codeword based SU-MIMO (hereinafter, referred to as MCW SU-MIMO) system and a method of allocating a PHICH index from an uplink data channel on the channel are proposed. In addition, methods of defining and representing control information in a Downlink Control Information (DCI) format on an uplink grant PDCCH necessary for allocating a PHICH and specifying a detailed transmission scheme of the MCW SU-MIMO scheme are proposed.

First, in the uplink MCW SU-MIMO system, a method of transmitting a single ACK/NACK for multiple codewords and a method of transmitting an ACK/NACK for each of multiple codewords may be considered. The content of the above-proposed methods may vary according to these two methods. Accordingly, the above-proposed methods will be described separately.

1. Method of Transmitting Single ACK/NACK in Uplink MCW SU-MIMO

Hereinafter, on the assumption that a single ACK/NACK is transmitted in UL MCW SU-MIMO, a HARQ process indication method, a DM-RS cyclic shift index indication method, and a method of constructing MCS indication content of n codewords will be described.

In certain uplink data transmission situations, if MCW SU-MIMO is used, HARQ processes corresponding in number to the number of codewords may be activated in transmission using n ($1 \leq n \leq 2$ or $1 \leq n \leq 4$) codewords according to a codeword-to-layer mapping rule on a per rank basis. However, to this end, as new technical matters of the conventional LTE standard are generated due to n ACKs/NACKs and the HARQ processing indication on an uplink grant channel or increase in the number of HARQ processes from the viewpoint of UE, forward and backward compatibility between the LTE system and the LTE-A system may become complicated.

Figure 10:
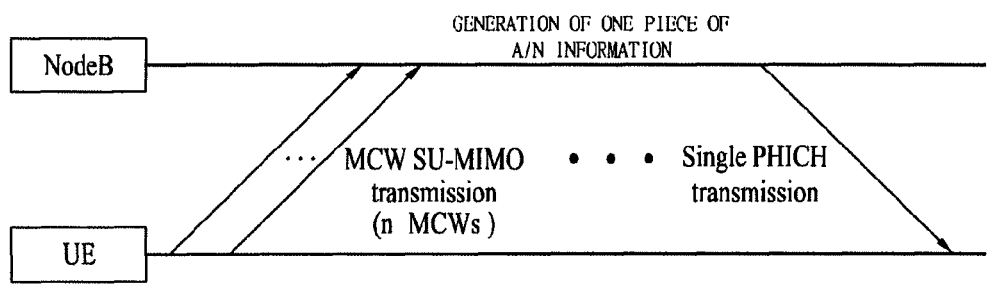
FIG. 10 is a diagram illustrating PHICH transmission according to an embodiment of the present invention.

FIG. 10 is a diagram illustrating PHICH transmission according to an embodiment of the present invention. In order to solve the above problem, the present invention proposes a method of receiving codewords from a certain UE using MCW SU-MIMO, performing error detection using a CRC on a per codeword basis, utilizing the codewords in Successive Interference Cancellation (SIC) decoding, and transmitting one piece of ACK/NACK information for all n codewords through a downlink PHICH for the purpose of maintaining a single ACK/NACK implemented in the LTE system, a single HARQ on an uplink grant PDCCH, and the number of HARQ processes in the conventional UE uplink transmission.

The ACK/NACK information may be generated using a certain method according to a specific purpose. For example, ACK may be generated when errors are not detected in all n codewords and, otherwise, NACK may be generated. Thus, one HARQ process is set with respect to all n codewords. To this end, variations in the PHICH channel design, channel index allocation method and the uplink HARQ process operation in the conventional LTE system may be significantly restricted. In an embodiment associated with the proposal of the present invention, if the number of HARQ processes allocated to a certain UE in certain carriers of the system is 8 for each of codewords used for transmission, that is, transport blocks, information which may be considered with respect to the contents of the UL grant channel for specifying UL SU-MIMO transmission and methods supporting UL SU-MIMO in association with the information will be proposed as follows.

(1) HARQ Process Indication

This is a field indicating a single HARQ process with respect to n codewords. In the case of MCW SU-MIMO, as proposed in the present invention, if one HARQ process is performed with respect to n codewords, one of process indexes 0 to 7 is allocated. Even in the case where a HARQ process is individually allocated to each codeword, if a HARQ index for a certain reference codeword is specified while being represented by 3 bits, the HARQ processes for the other n−1 codewords are automatically calculated based on a fixed offset.

In this case, as described in the present invention, when one piece of ACK/NACK information is transmitted to a UE in downlink, an empty phenomenon is not generated in a higher layer buffer of the UE due to independent allocation of ACK/NACK to each codeword. Thus, in a state in which a rank greater than 1 is set in MCW SU-MIMO, null transmission of a certain codeword is not considered. Even when overriding a lower rank (causing single codeword transmission of a rank 1) in a higher rank state of an eNB (evolved Node B), if one HARQ process is allocated to n codewords, since indication for specifying a separate codeword is not required, errors are not generated due to allocation of 3 bits. The term "overriding" as used in the present invention means that a cell, a base station or a relay node informs a UE of a rank value indicating an uplink channel state to be applied when a UE transmits a PUSCH using MCW SU-MIMO. If one ACK/NACK is used with respect to n codewords and individual HARQ processes are allocated, additional bits indicating the codewords may be added to the 3-bit HARQ process indication field or may be defined as a separate explicit codeword indication field. In association with the HARQ process, a New Data Indicator (NDI) may be signaled along with an uplink grant PDCCH. Even when one HARQ process is defined and signaled, the NDI may be individually set on a per codeword basis. In some cases, since one HARQ process is defined, one NDI may be defined and signaled as an uplink grant PDCCH.

(2) Method of Indicating Cyclic Shift Index Demodulation-Reference Signal (DM-RS)

A method of indicating a cyclic shift index of a DM-RS on an uplink channel will be divided into three cases as follows.

1) First Case

In the first case, in the implementation of the conventional UL SU-MIMO, there is a need for RSs for providing channel estimation for demodulation and decoding of p ($p \leq m$) reception data streams according to a transmission (Tx) antenna/layer configuration of a UE, which is defined by m (for example, m may be 2 or 4, 1 or 2, or 3 or 4) representing the number of transmission antennas (virtual antennas or physical antennas) or the number of virtual antennas or the number of transmission layers. At this time, q ($q \leq p$) RSs among the P RSs may be specified as the cyclic shift version of the QPSK-based computer-generated sequence of a low correlation property of the case of 1RB/2RB or the CAZAC base sequence having the length of a region for data transmission on frequency subcarriers in certain OFDM, SC-FDMA or clustered SC-FDMA symbols (as TDM, one OFDM, SC-FDMA or clustered SC-FDMA symbol may be specified or a plurality of OFDM, SC-FDMA or clustered SC-FDMA symbols may be specified, for RS transmission).

RS indexes, which are used as a criterion for indicating the q used cyclic shift indexes, may be 3 bits ling. As the remaining q−1 cyclic shift indexes are automatically specified using an offset, which is variably specified according to system circumstances by an arbitrary rule, a fixed offset or a fixed selection rule, it is possible to minimize overhead when the UE signals the used cyclic shift indexes.

2) Second Case

In the second case, as described in the first case, a combination of cyclic shifts for the remaining q−1 RSs different from a cyclic shift index for a RS which is used as a criterion for signaling cyclic shift indexes for q RSs may be specified or cyclic shift indexes for q RSs may be specified as 3+α ($0<α<3*(q-1)$) bits using a certain information compression rule. For example, α may be defined as a bit value of a sum of all or part of q−1 RS sequences of values (values less than 3 bits) representing a difference between the indexes for the RSs and the cyclic shift index for the RS which is used as the criterion.

3) Third Case

In the third case, as described in the first case, cyclic shifts for q RSs are explicitly specified on the UL grant channel with respect to q RSs. In this case, the size of the RS cyclic shift field in the control information payload of the UL channel may be 3*q if the bit size of the individual cyclic shift field is 3 bits.

If p and q are the same in the first cases, RSs of CAZAC sequence of a data band in one or more OFDM, SC-FDMA or clustered SC-FDMA symbols are used as all RSs for all antennas. In the present invention, it is assumed that the antenna includes a virtual antenna, a physical antenna and a transmission layer.

If p and q are different in the first case, as the number of cyclic shifts which can be provided such that the CAZAC RS sequences transmitted through certain OFDM, SC-FDMA or clustered SC-FDMA symbols are orthogonal, in a state in which the cyclic shifts for p RSs are not sufficient to enable allocation of one OFDM, SC-FDMA or clustered SC-FDMA symbol to each slot, OFDM, SC-FDMA or clustered SC-FDMA symbols for transmitting a plurality of RS sequences are allocated as in the first case and the additional CAZAC RS sequences may be continuously allocated. However, since such an allocation scheme directly deteriorates UL throughput, heterogeneous RSs having low overhead, which are generated using different methods, are used along with the q CAZAC RSs. The number of heterogeneous RSs is set to p−q which is equal to or greater than 0. At this time, for entire overhead adjustment, q may be 0.

As an embodiment of the design of the RS different from the conventional TDM (OFDM, SC-FDMA or clustered SC-FDMA symbols)-CDM (CAZAC) sequences, in the case of using SC-FDMA or clustered SC-FDMA, a scheme for inserting RSs into a time sample region within arbitrary transmission symbols or r ($r≧1$) predetermined time domain symbol positions at a previous stage of the DFT or a next stage of the IDFT (or IFFT) may be considered.

The RSs inserted into the time domain at the previous stage of the DFT are subjected to spread spectrum spreading to all subcarriers of the frequency domain within the DFT region through DFT, are subjected to IFFT, are transmitted to a receiver through a channel, and are subjected to FFT and IFFT in the receiver, thereby extracting channel information of the antenna on a band for transmitting data from r RSs of the symbol positions.

A scheme for directly mapping RS sequences to a frequency domain without performing DFT and performing IFFT with respect to the mapped RS sequences and a scheme for directly mapping RS sequences to an OFDM, SC-FDMA or clustered SC-FDMA symbol region on a next stage of IFFT may be applied. The OFDM, SC-FDMA or clustered SC-FDMA symbol region may be the entire OFDM, SC-FDMA or clustered SC-FDMA symbol region or a partial time sample region of the OFDM, SC-FDMA or clustered SC-FDMA symbols. In the case where RSs are inserted into OFDM, SC-FDMA or clustered SC-FDMA symbols for transmitting data, the fixed positions in the OFDM, SC-FDMA or clustered SC-FDMA symbols may be specified and the RSs are inserted at the fixed positions or the RSs may be inserted at positions generated from resource block indexes and/or cell IDs according to a certain rule. In the case where overhead of additional RSs is added, from the viewpoint of data and multiplexing, resources to which RSs will be mapped may be secured using puncturing of symbols for transmitting data or rate matching.

The UL RS design scheme is applicable not only to the UL SU-MIMO scheme but also to non-spatial multiplexing schemes. In the case of DM-RS, under situation that DM-RS transmission OFDM, SC-FDMA or clustered SC-FDMA symbols designed based on the conventional TDM-CDM are present, the UL-RS design scheme may be additionally defined in different OFDM, SC-FDMA or clustered SC-FDMA symbols. Alternatively, the UL-RS design scheme may be applied to replace the scheme designating DM-RS transmission OFDM, SC-FDMA or clustered SC-FDMA symbols designed based on the conventional TDM-CDM. The UL RS design scheme is applicable to not only the DM-RS but also the SRS.

If the OFDM, SC-FDMA or clustered SC-FDMA scheme is applied to UL transmission, a pattern in which RSs are inserted at fixed frequency subcarrier positions within resource blocks in resource block units may be defined. Such a pattern may be cell-specifically defined by a certain function or rule using a cell ID as an input signal. The resource block includes both a virtual resource block and a physical resource block. Accordingly, RSs may be inserted upon symbol mapping before IFFT input of the transmitter. If RSs are inserted into one or more OFDM, SC-FDMA or clustered SC-FDMA symbols for transmitting data, the RSs may be inserted into fixed positions or positions generated from a resource block index and/or cell ID according to a certain rule. At this time, resources to which RSs will be mapped may be secured using puncturing of symbols for transmitting data or rate matching.

In a certain system, with respect to p−q RSs among p RSs, in an environment in which an RS transmission scheme different from the conventional TDM-based CAZAC RS transmission scheme is applied, for a certain purpose, a scheme for transmitting RSs on a per transmission antenna or transmission layer basis and a scheme for allocating an index may be considered. Tx antenna/layer configuration may vary according to UEs. For example, in the case of 2Tx antenna configuration or 2-layer transmission, antenna port indexes or layer port indexes #i and #(i+1) are specified on a per transmission antenna or transmission layer basis ($i≧0$). As another example, in the case of 4Tx antenna configuration or 4-layer transmission, antenna port indexes or layer port indexes #i, #(i+1), #(i+2) and #(i+3) may be specified on a per transmission antenna or transmission layer basis. At this time, a scheme for applying the TDM-based CAZAC RSs with relatively excellent channel estimation performance to q antenna ports from a low antenna port index in ascending order, generating sequences using a method different from the above method and applying RSs mapped to physical resources to the remaining antenna ports is proposed.

In addition to content of the UL grant channel, SRS should be generated and applied on a per antenna port or layer port basis according to the UL Tx antenna/layer configuration even in SRS design. At this time, in order to provide extended multiplexing capacity, the transmission period of the SRS per antenna port may be adjusted and defined in the time domain. In one embodiment of the present invention, under the condition that the same multiplexing capacity is provided to p transmission antennas or transmission layers in the same sequence design environment as the SRS of a single antenna, the transmission periods of the SRSs of the time domain of a certain UE are equal and a method for sequentially transmitting the SRS per antenna or layer of the UE is applicable. Alternatively or simultaneously, SRS code for providing the extended capacity may be designed in association with a frequency domain distributed comb scheme so as to support efficient CDM/FDM multiplexing capacity. Specifically, in consideration of a part or all of low correlated root indexes v of the sequences in a state in which not only cyclic shift u available in the code sequence level but also the sequence level scrambling are applied, code sequence resources may be increased v-fold. At this time, the part of the low correlated root indexes may indicate root indexes corresponding to the base sequences within a group if UL DM-RSs are grouped. The low correlated root indexes are transmitted to the UE through L1/L2 control signaling or higher-layer RRC signaling.

If subcarriers, which are physical resources to which sequence elements are mapped, are mapped at a fixed offset interval using the distributed comb scheme, a comb offset value may be adjusted according to channel conditions, SRS transmission load or time required for channel sounding. Alternatively or simultaneously, a limited sounding band (e.g., 5 MHz) is specified with respect to the entire system bandwidth (e.g., 20 MHz) to which the SU-MIMO is mapped, sounding and packet scheduling are performed within the limited band and a virtual sub system band for a plurality of UL SU-MIMO schemes is divided and used, thereby supporting multiplexing capacity in the frequency domain. The offset value or the sounding band of the distributed comb scheme is transmitted to the UE through L1 (first layer)/L2 (second layer) control signaling or higher-layer RRC signaling.

(3) Configuration of MCS Indication Content for n Codewords

A method of allocating s bits so as to apply one MCS in a state in which a single HARQ process is specified with respect to n codewords and transmitting the MCS from a base station to a UE, a method of allocating s*n bits and transmitting an MCS per codeword without compression through an UL grant channel in consideration of error detection ability of n codewords, channel estimation ability of each antenna, and an optimal Precoding matrix Indication (PMI) computation state of a reception base station, and a method of allocating a total of s+(s−δ)*(n−1) bits by summing s bits representing an MCS value of a reference codeword and (s−δ)*(n−1) bits representing a difference between s and δ of the remaining n−1 codewords may be applied. The selection of the method of specifying the MCS according to the codewords may be independent of the selection of the HARQ process indication method. That is, during a single HARQ process, a single ACK/NACK information feedback method is applied to MCW SU-MIMO transmission and control information for specifying the MCS according to codewords may be signaled to a UE through an UL grant PDCCH.

Up to now, the HARQ process indication method, the method of indicating the cyclic shift of the DM-RS and the method of indicating the MCS for the codewords on the assumption that a single ACK/NACK is transmitted in UL MCW SU-MIMO have been described.

Hereinafter, a method of transmitting multiple ACKs/NACKs in UL MCW SU-MIMO will be described and then a PHICH resource allocation method, a HARQ process indication method, a method of indicating a cyclic shift of a DM-RS, and a method of indicating an MCS for codewords when multiple ACKs/NACKs are transmitted will be described.

2. Method of Transmitting Multiple ACKs/NACKs Using UL MCW SU-MIMO

In certain UL data transmission, if MCW SU-MIMO is used, HARQ processes corresponding in number to the number of codewords may be activated under change impact of the conventional LTE system in transmission using n ($1 \leq n \leq 2$ or $1 \leq n \leq 4$) codewords according to a codeword-to-layer mapping rule on a per rank basis. That is, DL ACK/NACK information transmission may be defined with respect to transmission on a per codeword basis. Hereinafter, the present invention proposes a method of receiving codewords from a certain UE using MCW SU-MIMO, performing error detection, utilizing a CRC on a per codeword basis using the codewords in Successive Interference Cancellation (SIC) decoding, and transmitting individual ACK/NACK information through a downlink PHICH with respect to all n codewords.

(1) PHICH Resource Assignment Method

The number of PHICH groups on a downlink PHICH for UL transmission specified in the conventional LTE system without MCW SU-MIMO needs to be determined on the assumption that the ACK/NACK for UL transmission is individually indicated on a per codeword basis in a state in which MCW SU-MIMO is additionally applied in the LTE-A system. That is, when the amount of ACK/NACK information to be transmitted from a certain cell, base station or relay node in downlink must be increased due to introduction of UL MCW SU-MIMO and the number of PHICH groups is set to a constant with respect to all subframes based on the maximum amount of PHICH resources required in an UL system bandwidth, as MCW SU-MIMO is newly introduced into UEs of the LTE-A system, the number of PHICH groups must be set based on the amount of PHICH resources which is equal to or less than two times that of the LTE system.

A Physical Downlink Control Channel (PDCCH) is transmitted through first three or less OFDM symbols of each subframe, and the number of OFDM symbols may be adjusted to 1 to 3 according to downlink control channel overhead. A channel used to adjust the number of OFDM symbols for the PDCCH for each subframe is a Physical Control Format Indicator Channel (PCFICH) and a channel used to transmit ACKnowledgement/Negative ACKnowledgement (ACK/NACK) information for an UL data channel is a Physical Hybrid ARQ Indicator Channel (PHICH). In addition, a control channel used to send control information for downlink data transmission or UL data transmission is a Physical Downlink Control Channel (PDCCH).

The PHICH transmits ACK/NACK for an UL data channel. Several PHICH groups are included in one subframe, and one PHICH group includes several PHICHs. Accordingly, PHICHs of several UEs are included in one PHICH group. The allocation of PHICHs to the UEs in several PHICH groups is performed using a lowest PRB index of PUSCH resource allocation and a frequency cyclic shift of a DM-RS transmitted through a UL grant signal. PHICH channel resources are index pairs of ($n_{PHICH}^{group}$, $n_{PHICH}^{seq}$). Here, $n_{PHICH}^{group}$ of ($n_{PHICH}^{group}$, $n_{PHICH}^{seq}$) denotes a PHICH group index and $n_{PHICH}^{seq}$ denotes an orthogonal sequence index within the PHICH group.

PHICH resources may be allocated using only some (that is, PHICH groups based on the number of PHICHs defined in the conventional LTE system) of an increased number of PHICH groups defined in the UL transmission of the UEs of the conventional LTE system. As a method of allocating PHICH resources to the UEs of the conventional LTE system and supporting backward compatibility from the viewpoint of PDCCH resource mapping, a value $N_g$ of a cell-specific Radio Resource Control (RRC) parameter is always set to be greater than a necessary value and DL PHICH resources among PHICH groups calculated based on the set value of $N_g$ are allocated to the UEs of the LTE-A system. PHICH allocation may be performed based on a rule of minimizing collision with allocation of PHICH to the UEs of the conventional LTE system. Several embodiments of the method of calculating the number of PHICH groups are proposed.

1) First Method of Calculating Number of DL PHICH Groups

The number of DL PHICH groups may be calculated using Equation 1.

$$N_{PHICH}^{group} = \begin{cases} \lceil N_g(N_{RB}^{DL} \cdot N_c/8) \rceil & \text{for normal cyclic prefix} \\ 2 \cdot \lceil N_g(N_{RB}^{DL} \cdot N_c/8) \rceil & \text{for extended cyclic prefix} \end{cases} \quad \text{Equation 1}$$

In Equation 1, $N_g \in \{1/6, 1/2, 1, 2\}$ may be provided by higher layer signaling and $N_g$ may scale the number of PHICH groups to be different in DL and UL system bands. That is, $N_g$ serves to adjust the number of PHICHs according to current circumstances. In Equation 1, $N_{RB}^{DL}$ denotes the number of resource blocks available in a DL system band and $N_c$ denotes the maximum number of codewords (that is, the number of encoding blocks) during UL transmission in a cell, a base station or a system.

2) Second Method of Calculating Number of DL PHICH Groups

Without using $N_c$ in the equation as a new parameter, an equation of extending the range of the value $N_g$ provided by conventional higher layer signaling and extending a bit size of an L1 parameter associated therewith from 2 bits to 3 bits so as to calculate the number of DL PHICH groups may be defined and expressed by Equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{Equation 2}$$

In Equation 2, the range of $N_g$ may be defined as one of $N_g \in \{1/6, 1/3, 1/2, 1, 2, 4\}$, $N_g \in \{1/6, 1/3, 1/2, 1, 2, 3, 4\}$ and $N_g \in \{1/6, 1/4, 1/3, 1/2, 1, 2, 3, 4\}$. A series of cell-specific RRC parameters representing the value $N_g$ of the UEs of the LTE-A system to which UL SU-MIMO or carrier aggregation is applied may be newly defined so as to be distinguished from cell-specific RRC parameters representing the value $N_g$ of the UEs of the conventional LTE system, in consideration of backward compatibility with the UEs of the conventional LTE system.

3) Third Method of Calculating Number of DL PHICH Groups

Instead of $N_{RB}^{DL}$, an equation of calculating the number of DL PHICH groups using $N_{RB}^{UL}$ which is the number of resource blocks available in a UL system band may be defined and expressed by Equation 3.

$$N_{PHICH}^{group} = \begin{cases} \lceil N_g(N_{RB}^{UL} \cdot N_c/8) \rceil & \text{for normal cyclic prefix} \\ 2 \cdot \lceil N_g(N_{RB}^{UL} \cdot N_c/8) \rceil & \text{for extended cyclic prefix} \end{cases} \quad \text{Equation 3}$$

In Equation 3, $N_g \in \{1/6, 1/2, 1, 2\}$ may be provided by higher layer signaling and $N_g$ may scale the number of PHICH groups to be different in DL and UL system bands. That is, $N_g$ serves to adjust the number of PHICHs according to current circumstances. In Equation 1, $N_{RB}^{DL}$ denotes the number of resource blocks available in a DL system band and $N_c$ denotes the maximum number of codewords (that is, the number of encoding blocks) during UL transmission in a cell, a base station or a system.

In the method of defining the number of PHICH groups, even in the LTE system, $N_g$ may be set to 1, the range of $N_g$ may be defined as $N_g \in \{1/6, 1/2, 1, 2\}$ or the range of $N_g$ may be defined with respect to a plurality of cases or may be defined as a constant of 1.

4) Fourth Method of Calculating Number of DL PHICH Groups $N_{RB}^{UL}$, which is the number of resource blocks available in a UL system band, is used instead of $N_{RB}^{DL}$. Without using $N_c$ in the equation as a new parameter, an equation extending the range of the value $N_g$ provided by conventional higher layer signaling and extending a bit size of an L1 parameter associated therewith from 2 bits to 3 bits so as to calculate the number of DL PHICH groups may be defined and expressed by Equation 4.

$$N_{PHICH}^{group} = \begin{cases} \lceil N_g(N_{RB}^{UL}/8) \rceil & \text{for normal cyclic prefix} \\ 2 \cdot \lceil N_g(N_{RB}^{UL}/8) \rceil & \text{for extended cyclic prefix} \end{cases} \quad \text{Equation 4}$$

In Equation 4, the range of $N_g$ may be defined as one of $N_g \in \{1/6, 1/3, 1/2, 1, 2, 4\}$, $N_g \in \{1/6, 1/3, 1/2, 1, 2, 3, 4\}$ and $N_g \in \{1/6, 1/4, 1/3, 1/2, 1, 2, 3, 4\}$. In addition, the range of $N_g$ may be defined with respect to a plurality of cases and may be defined as $N_g \in \{1, 2\}$, $N_g \in \{1, 2, 4\}$, $N_g \in \{1/2, 1, 2, 4\}$ or a constant of 1. In the fourth method of calculating the number of PHICH groups, a method of calculating the number of PHICH groups using the parameter $N_{RB}^{UL}$ applicable to the equations of the first and second methods of calculating the number of PHICH groups by replacing $N_{RB}^{DL}$ with $N_{RB}^{UL}$.

A series of cell-specific RRC parameters representing the value $N_g$ of the UEs of the LTE-A system to which UL SU-MIMO or carrier aggregation is applied may be newly defined so as to be distinguished from cell-specific RRC parameters representing the value $N_g$ of the UEs of the conventional LTE system, in consideration of backward compatibility with the UEs of the conventional LTE system.

Before description of resource group alignment of individual PHIICH groups based on the number of PHICH groups, layer mapping and precoding scheme, in order to support backward and forward compatibility of the UE of the LTE system and the UE of the LTE-A system with the LTE-A and LTE networks, even in a state in which the number of DL transmission antennas of the LTE-A system is eight, DL PDCCH, PCFICH and PHICH are transmitted using a transmit diversity scheme based on four transmission antennas.

In addition, even in a state in which eight transmission antennas are used, the amount and positions of subcarrier resources in a frequency domain used for DL RS transmission of first and second OFDM symbols may be set to be equal to those of the conventional LTE system. Thus, while resource group alignment of PDCCH, PCFICH and PHICH, layer mapping and precoding scheme are maintained similar to the LTE scheme, compatibility is supported.

Based on the number of PHICH groups obtained by the method proposed by the present invention, resource group alignment, layer mapping and precoding scheme, PHICH resource assignment for UL transmission of an individual UE may be expressed by a pair $(n_{PHICH}^{group}, n_{PHICH}^{seq})$ of the index $n_{PHICH}^{group}$ for the PHICH group and the orthogonal sequence index $n_{PHICH}^{seq}$ generated due to spreading code and I-Q multiplexing within the PHICH group.

In a state in which PHICH resource allocation is performed in a certain UE according to individual codewords or codeword groups by introduction of UL SU-MIMO based on multiple codewords, the PHICH resource pair may be expressed by $(n_{PHICH}^{group}(i), n_{PHICH}^{seq}(i))$ with respect to a certain codeword index i (i=1, . . . , n where n (=1, . . . , $N_{PHICH}^{max}$)). At this time, i denotes the number of codewords used for UL SU-MIMO transmission, and $N_{PHICH}^{max}$ denotes a predetermined maximum number of PHICH channels in UL SU-MIMO. $N_{PHICH}^{max}$ may be equal to a maximum number of codewords available in UL SU-MIMO or the number of groups of codewords available in UL SU-MIMO.

The PHICH group index $n_{PHICH}^{group}(i)$ and the PHICH orthogonal sequence index $n_{PHICH}^{seq}(i)$ proposed by the present invention are determined by a cyclic shift index of a UL DM-RS used for UL transmission and a lowest index value of physical resource block allocation. At this time, a cyclic shift index of a UL DM-RS is used as a parameter to allocate different PHICH resources to PHICHs required in UL SU-MIMO to which multiple codewords are applied. If UL PUSCH transmission is not performed through a UL grant PDCCH, the cyclic shift index of the UL DM-RS may be a predetermined value (e.g., an index #0) or may be specified by a UE or a relay node when a transmission session is activated through RRC parameter signaling or L1/L2 PDCCH signaling of the UE or the relay node.

The number of antenna ports used for UL SU-MIMO transmission in a certain UE may be P, the number of codewords used in SU-MIMO is a maximum of N, and an individual antenna port index p (p=1, . . . , P−1) may be defined. In UL SU-MIMO, a total of P indexes of RS sequences generated using the cyclic shift of the UL DM-RS and/or other method are allocated on a per antenna port basis. If P and n are the same, individual RS sequence indexes may be used as DM-RS sequence indexes (or cyclic shift indexes) $n_{RS}^{seq}(i)$ per n codewords used in a process of deriving values of $n_{PHICH}^{group}(i)$ and $n_{PHICH}^{seq}(i)$. In contrast, if P is greater than n, indexes which may be used as a value of $n_{RS}^{seq}(i)$ among the RS sequence indexes must be selected.

As the selection method, a method of selecting n indexes from among P RS sequence indexes in ascending order, a method of selecting n every other RS sequence indexes (e.g., first, third, fifth indexes) in ascending order, or a method of selecting indexes using a rule based on a certain function, a method of randomly selecting indexes, or a method of selecting indexes in order of a first index, a last index, a second index, and the second to last index may be used. In addition, if P DM-RS sequences are generated using the method of generating DM-RS sequences using a CAZAC or ZC method or the method of generating DM-RS sequences using another method, n indexes may be selected from among cyclic shift indexes generated using the method of generating the DM-RS sequences using the CAZAC or ZC method, using any one of the methods of the present invention.

The values of $n_{PHICH}^{group}(i)$ and $n_{PHICH}^{seq}(i)$ may be derived based on $n_{RS}^{seq}(i)$ of an individual codeword index i using the above method. Alternatively, the values of $n_{PHICH}^{group}(i)$ and $n_{PHICH}^{seq}(i)$ may be adjusted and derived using a certain function f(i) in addition to $n_{RS}^{seq}(i)$ of the codeword index i so as to minimize collision with PHICH channel resource allocation of the UEs of the conventional LTE system. The value i of the function f(i) is configured in a higher layer and may be signaled to the UE of the LTE-A system through a series of UE-specific RRC signaling. Hereinafter, various methods of computing the PHICH group index $n_{PHICH}^{group}(i)$ and the PHICH orthogonal sequence index $n_{PHICH}^{seq}(i)$ are proposed.

1) First Method

The PHICH group index $n_{PHICH}^{group}(i)$ and the PHICH orthogonal sequence index $n_{PHICH}^{seq}(i)$ may be computed by Equation 5.

$$n_{PHICH}^{group}(i) = (I_{PRB\_RA}^{lowest\_index} + n_{RS}^{seq}(i))\mathrm{mod} N_{PHICH}^{group} + I_{PHICH} N_{PHICH}^{group} \quad \text{Equation 5}$$

$$n_{PHICH}^{seq}(i) = (\lfloor I_{PRB\_RA}^{lowest\_index} / N_{PHICH}^{group} \rfloor + n_{RS}^{seq}(i))\mathrm{mod} 2N_{SF}^{PHICH}$$

$$I_{PHICH} = \begin{cases} 1 & \text{for TDD UL/DL configuration 0 with} \\ & \text{PUSCH transmission in subframe } n = 4 \text{ or } 9 \\ 0 & \text{otherwise} \end{cases}$$

where, $N_{SF}^{PHICH}$ denotes the size of a Spreading Factor (SF) used in PHICH modulation, and $I_{PRB\_RA}^{lowest\_index}$ denotes a lowest index of a Physical Resource Block (PRB) of UL resource allocation. $N_{PHICH}^{group}$ denotes the number of PHICH groups configured by a higher layer.

2) Second Method

The PHICH group index $n_{PHICH}^{group}(i)$ and the PHICH orthogonal sequence index $n_{PHICH}^{seq}(i)$ may be computed by Equation 6.

$$n_{PHICH}^{group}(i) = \quad \text{Equation 6}$$
$$(I_{PRB\_RA}^{lowest\_index} + n_{RS}^{seq}(i) + f(i))\mathrm{mod} N_{PHICH}^{group} + I_{PHICH} N_{PHICH}^{group}$$

$$n_{PHICH}^{seq}(i) =$$
$$(\lfloor I_{PRB\_RA}^{lowest\_index} / N_{PHICH}^{group} \rfloor + n_{RS}^{seq}(i) + f(i))\mathrm{mod} 2N_{SF}^{PHICH}$$

$$I_{PHICH} = \begin{cases} 1 & \text{for TDD UL/DL configuration 0 with} \\ & \text{PUSCH transmission in subframe } n = 4 \text{ or } 9 \\ 0 & \text{otherwise} \end{cases}$$

where, $N_{SF}^{PHICH}$ denotes the size of a Spreading Factor (SF) used in PHICH modulation, and $I_{PRB\_RA}^{lowest\_index}$ denotes a lowest index of a Physical Resource Block (PRB) of UL resource allocation. $N_{PHICH}^{group}$ denotes the number of PHICH groups configured by a higher layer. In addition, f(i) denotes a function for providing a unique codeword offset and may be a function f(i)=i or a constant which is previously set on a per codeword index basis.

3) Third Method

The PHICH group index $n_{PHICH}^{group}(i)$ and the PHICH orthogonal sequence index $n_{PHICH}^{seq}(i)$ may be computed by Equation 7.

$$n_{PHICH}^{group}(i) = \quad \text{Equation 7}$$
$$(I_{PRB\_RA}^{lowest\_index} + n_{RS}^{seq}(i) + f(i)) \mod N_{PHICH}^{group} + I_{PHICH} N_{PHICH}^{group}$$

$$n_{PHICH}^{seq}(i) =$$
$$(\lfloor I_{PRB\_RA}^{lowest\_index} / N_{PHICH}^{group} \rfloor + n_{RS}^{seq}(i) + f(i)) \mod 2N_{SF}^{PHICH}$$

$$I_{PHICH} = \begin{cases} 1 & \text{for TDD UL/DL configuration 0 with} \\ & \text{PUSCH transmission in subframe } n = 4 \text{ or } 9 \\ 0 & \text{otherwise} \end{cases}$$

where, $N_{SF}^{PHICH}$ denotes the size of a Spreading Factor (SF) used in PHICH modulation, and $I_{PRB\_RA}^{lowest\_index}$ denotes a lowest index of a Physical Resource Block (PRB) of UL resource allocation. $N_{PHICH}^{group}$ denotes the number of PHICH groups configured by a higher layer. In addition, $f(i)=\alpha \cdot i$ denotes a function for providing a unique codeword offset and α may be a non-zero constant provided by higher layer signaling.

4) Fourth Method

The PHICH group index $n_{PHICH}^{group}(i)$ and the PHICH orthogonal sequence index $n_{PHICH}^{seq}(i)$ may be computed by Equation 8.

$$n_{PHICH}^{group}(i) = \quad \text{Equation 8}$$
$$(I_{PRB\_RA}^{lowest\_index} + n_{RS}^{seq}(i) \cdot f(i)) \mod N_{PHICH}^{group} + I_{PHICH} N_{PHICH}^{group}$$

$$n_{PHICH}^{seq}(i) =$$
$$(\lfloor I_{PRB\_RA}^{lowest\_index} / N_{PHICH}^{group} \rfloor + n_{RS}^{seq}(i) \cdot f(i)) \mod 2N_{SF}^{PHICH}$$

$$I_{PHICH} = \begin{cases} 1 & \text{for TDD UL/DL configuration 0 with} \\ & \text{PUSCH transmission in subframe } n = 4 \text{ or } 9 \\ 0 & \text{otherwise} \end{cases}$$

where, $N_{SF}^{PHICH}$ denotes the size of a Spreading Factor (SF) used in PHICH modulation, and $I_{PRB\_RA}^{lowest\_index}$ denotes a lowest index of a Physical Resource Block (PRB) of UL resource allocation. $N_{PHICH}^{group}$ denotes the number of PHICH groups configured by a higher layer. In addition, f(i) denotes a function for providing a unique codeword offset and may be a function f(i)=i or a non-zero constant which is previously set on a per codeword index basis.

5) Fifth Method

The PHICH group index $n_{PHICH}^{group}(i)$ and the PHICH orthogonal sequence index $n_{PHICH}^{seq}(i)$ may be computed by Equation 9.

$$n_{PHICH}^{group}(i) = \quad \text{Equation 9}$$
$$(I_{PRB\_RA}^{lowest\_index} + n_{RS}^{seq}(i) \cdot f(i)) \mod N_{PHICH}^{group} + I_{PHICH} N_{PHICH}^{group}$$

$$n_{PHICH}^{seq}(i) =$$
$$(\lfloor I_{PRB\_RA}^{lowest\_index} / N_{PHICH}^{group} \rfloor + n_{RS}^{seq}(i) \cdot f(i)) \mod 2N_{SF}^{PHICH}$$

$$I_{PHICH} = \begin{cases} 1 & \text{for TDD UL/DL configuration 0 with} \\ & \text{PUSCH transmission in subframe } n = 4 \text{ or } 9 \\ 0 & \text{otherwise} \end{cases}$$

where, $N_{SF}^{PHICH}$ denotes the size of a Spreading Factor (SF) used in PHICH modulation, and $I_{PRB\_RA}^{lowest\_index}$ denotes a lowest index of a Physical Resource Block (PRB) of UL resource allocation. $N_{PHICH}^{group}$ denotes the number of PHICH groups configured by a higher layer. In addition, $f(i)=\alpha \cdot i+1$ or $f(i)=\alpha \cdot (i+1)$ denotes a function for providing a unique codeword offset and α may be a non-zero constant provided by higher layer signaling.

Any one of the above-proposed methods of deriving the values $n_{PHICH}^{group}(i)$ and $n_{PHICH}^{seq}(i)$ may be used in association with any one of the above-described methods of defining the number PHICH groups. The method of calculating the number of PHICH groups and the PHICH allocation methods associated therewith are not limited to UL SU-MIMO and are applicable to all cases requiring allocation of a plurality of PHICHs to a certain UE due to introduction of LTE-A technology such as UL carrier aggregation or UL coordinated Multi-point (CoMP).

Up to now, PHICH resource allocation was described. Hereinafter, on the assumption that multiple ACKs/NACKs are transmitted using UL MCW SU-MIMO, a HARQ process indication method, a DM-RS cyclic shift index indication method, and a method of constructing MCS indication content of n codewords will be described.

(1) HARQ Process Indication

This is a field indicating a single or a plurality of HARQ processes with respect to n codewords. Even in the case where a HARQ process is individually allocated to a codeword, if a HARQ index of a certain reference codeword is specified while being represented by 3 bits, the HARQ processes of the other n−1 codewords are automatically calculated based on a fixed offset. Additional bits indicating the codewords may be added to the 3-bit HARQ process indication field or may be defined as a separate explicit codeword indication field.

(2) Method of Indicating Cyclic Shift Index Demodulation-Reference Signal (DM-RS)

A method of indicating a cyclic shift index of a DM-RS on an UL channel will be divided into three cases as follows.

1) First Case

In the first case, in the implementation of the conventional UL SU-MIMO, there is a need for RSs for providing channel estimation for demodulation and decoding of p (p≦m) reception data streams according to a transmission (Tx) antenna/layer configuration of a UE, which is defined by m (for example, m may be 2 or 4, 1 or 2, or 3 or 4) representing the number of transmission antennas (virtual antennas or physical antennas) or the number of virtual antennas or the number of transmission layers. At this time, q (q≦p) RSs among the P RSs may be specified as the cyclic shift version of the QPSK-based computer-generated sequence of a low correlation property of the case of 1RB/2RB or the CAZAC base sequence having the length of a region for data transmission on frequency subcarriers in certain OFDM, SC-FDMA or clustered SC-FDMA symbols (as TDM, one OFDM, SC-FDMA or clustered SC-FDMA symbol may be specified or a plurality of OFDM, SC-FDMA or clustered SC-FDMA symbols may be specified, for RS transmission).

RS indexes, which are used as a criterion for indicating the q used cyclic shift indexes, may be 3 bits ling. As the remaining q−1 cyclic shift indexes are automatically specified using an offset, which is variably specified according to system circumstances by an arbitrary rule, a fixed offset or a fixed selection rule, it is possible to minimize overhead when the UE signals the used cyclic shift indexes.

2) Second Case

In the second case, as described in the first case, a combination of cyclic shifts for the remaining q−1 RSs different from a cyclic shift index for a RS which is used as a criterion for signaling cyclic shift indexes for q RSs may be specified or cyclic shift indexes for q RSs may be specified as 3+α (0<α<3*(q−1)) bits using a certain information compression rule. For example, α may be defined as a bit value of a sum of all or part of q−1 RS sequences of values (values less than 3 bits) representing a difference between the indexes for the RSs and the cyclic shift index for the RS which is used as the criterion.

3) Third Case

In the third case, as described in the first case, cyclic shifts for q RSs are explicitly specified on the UL grant channel with respect to q RSs. In this case, the size of the RS cyclic shift field in the control information payload of the UL channel may be 3*q if the bit size of the individual cyclic shift field is 3 bits.

If p and q are the same in the first cases, RSs of CAZAC sequence of a data band in one or more OFDM, SC-FDMA or clustered SC-FDMA symbols are used as all RSs for all antennas. In the present invention, it is assumed that the antenna includes a virtual antenna, a physical antenna and a transmission layer.

If p and q are different in the first case, as the number of cyclic shifts which can be provided such that the CAZAC RS sequences transmitted through certain OFDM, SC-FDMA or clustered SC-FDMA symbols are orthogonal, in a state in which the cyclic shifts for p RSs are not sufficient to enable allocation of one OFDM, SC-FDMA or clustered SC-FDMA symbol to each slot, OFDM, SC-FDMA or clustered SC-FDMA symbols for transmitting a plurality of RS sequences are allocated as in the first case and the additional CAZAC RS sequences may be continuously allocated. However, since such an allocation scheme directly deteriorates UL throughput, heterogeneous RSs having low overhead, which are generated using different methods, are used along with the q CAZAC RSs. The number of heterogeneous RSs is set to p−q which is equal to or greater than 0. At this time, for entire overhead adjustment, q may be 0.

As an embodiment of the design of the RS different from the conventional TDM (OFDM, SC-FDMA or clustered SC-FDMA symbols)-CDM (CAZAC) sequences, in the case of using SC-FDMA or clustered SC-FDMA, a scheme for inserting RSs into a time sample region within arbitrary transmission symbols or r ($r \geq 1$) predetermined time domain symbol positions at a previous stage of the DFT or a next stage of the IDFT (or IFFT) may be considered.

The RSs inserted into the time domain at the previous stage of the DFT are subjected to spread spectrum spreading to all subcarriers of the frequency domain within the DFT region through DFT, are subjected to IFFT, are transmitted to a receiver through a channel, and are subjected to FFT and IFFT in the receiver, thereby extracting channel information of the antenna on a band for transmitting data from r RSs of the symbol positions.

A scheme for directly mapping RS sequences to a frequency domain without performing DFT and performing IFFT with respect to the mapped RS sequences and a scheme for directly mapping RS sequences to an OFDM, SC-FDMA or clustered SC-FDMA symbol region on a next stage of IFFT may be applied. The OFDM, SC-FDMA or clustered SC-FDMA symbol region may be the entire OFDM, SC-FDMA or clustered SC-FDMA symbol region or a partial time sample region of the OFDM, SC-FDMA or clustered SC-FDMA symbols. In the case where RSs are inserted into OFDM, SC-FDMA or clustered SC-FDMA symbols for transmitting data, the fixed positions in the OFDM, SC-FDMA or clustered SC-FDMA symbols may be specified and the RSs are inserted at the fixed positions or the RSs may be inserted at positions generated from resource block indexes and/or cell IDs according to a certain rule. In the case where overhead of additional RSs is added, from the viewpoint of data and multiplexing, resources to which RSs will be mapped may be secured using puncturing of symbols for transmitting data or rate matching.

The UL RS design scheme is applicable not only to the UL SU-MIMO scheme but also to non-spatial multiplexing schemes. In the case of DM-RS, under situation that DM-RS transmission OFDM, SC-FDMA or clustered SC-FDMA symbols designed based on the conventional TDM-CDM are present, the UL-RS design scheme may be additionally defined in different OFDM, SC-FDMA or clustered SC-FDMA symbols. Alternatively, the UL-RS design scheme may be applied to replace the scheme designating DM-RS transmission OFDM, SC-FDMA or clustered SC-FDMA symbols designed based on the conventional TDM-CDM. The UL RS design scheme is applicable to not only the DM-RS but also the SRS.

If the OFDM, SC-FDMA or clustered SC-FDMA scheme is applied to UL transmission, a pattern in which RSs are inserted at fixed frequency subcarrier positions within resource blocks in resource block units may be defined. Such a pattern may be cell-specifically defined by a certain function or rule using a cell ID as an input signal. The resource block includes both a virtual resource block and a physical resource block. Accordingly, RSs may be inserted upon symbol mapping before IFFT input of the transmitter. If RSs are inserted into one or more OFDM, SC-FDMA or clustered SC-FDMA symbols for transmitting data, the RSs may be inserted into fixed positions or positions generated from a resource block index and/or cell ID according to a certain rule. At this time, resources to which RSs will be mapped may be secured using puncturing of symbols for transmitting data or rate matching.

In a certain system, with respect to p−q RSs among p RSs, in an environment in which an RS transmission scheme different from the conventional TDM-based CAZAC RS transmission scheme is applied, for a certain purpose, a scheme for transmitting RSs on a per transmission antenna or transmission layer basis and a scheme for allocating an index may be considered. Tx antenna/layer configuration may vary according to UEs. For example, in the case of 2Tx antenna configuration or 2-layer transmission, antenna port indexes or layer port indexes #i and #(i+1) are specified on a per transmission antenna or transmission layer basis ($i \geq 0$). As another example, in the case of 4Tx antenna configuration or 4-layer transmission, antenna port indexes or layer port indexes #i, #(i+1), #(i+2) and #(i+3) may be specified on a per transmission antenna or transmission layer basis. At this time, a scheme for applying the TDM-based CAZAC RSs with relatively excellent channel estimation performance to q antenna ports from a low antenna port index in ascending order, generating sequences using a method different from the above method and applying RSs mapped to physical resources to the remaining antenna ports is proposed.

In addition to content of the UL grant channel, SRS should be generated and applied on a per antenna port or layer port basis according to the UL Tx antenna/layer configuration even in SRS design. At this time, in order to provide extended multiplexing capacity, the transmission period of the SRS per antenna port may be adjusted and defined in the time domain. In one embodiment of the present invention, under the condition that the same multiplexing capacity is provided to p transmission antennas or transmission layers in the same sequence design environment as the SRS of a single antenna, the transmission periods of the SRSs of the time domain of a certain UE are equal and a method for sequentially transmitting the SRS per antenna or layer of the UE is applicable. Alternatively or simultaneously, SRS code for providing the extended capacity may be designed in association with a frequency domain distributed comb scheme so as to support efficient CDM/FDM multiplexing capacity. Specifically, in consideration of a part or all of low correlated root indexes v of the sequences in a state in which not only cyclic shift u available in the code sequence level but also the sequence level scrambling are applied, code sequence resources may be increased v-fold. At this time, the part of the low correlated root indexes may indicate root indexes corresponding to the base sequences within a group if UL DM-RSs are grouped. The low correlated root indexes are transmitted to the UE through L1/L2 control signaling or higher-layer RRC signaling.

If subcarriers, which are physical resources to which sequence elements are mapped, are mapped at a fixed offset interval using the distributed comb scheme, a comb offset value may be adjusted according to channel conditions, SRS transmission load or time required for channel sounding. Alternatively or simultaneously, a limited sounding band (e.g., 5 MHz) is specified with respect to the entire system bandwidth (e.g., 20 MHz) to which the SU-MIMO is mapped, sounding and packet scheduling are performed within the limited band and a virtual sub system band for a plurality of UL SU-MIMO schemes is divided and used, thereby supporting multiplexing capacity in the frequency domain. The offset value or the sounding band of the distributed comb scheme is transmitted to the UE through L1 (first layer)/L2 (second layer) control signaling or higher-layer RRC signaling.

(3) Configuration of MCS Indication Content for n Codewords

Unlike a method of allocating s bits so as to apply to one MCS in a state in which a single or a plurality of HARQ processes is specified with respect to n codewords and transmitting the MCS from a base station to a UE, a method of allocating s*n bits and transmitting an MCS per codeword without compression through an UL grant channel in consideration of error detection ability of n codewords, channel estimation ability of each antenna, and an optimal Precoding matrix Indication (PMI) computation state of a reception base station, and a method of allocating a total of $s+(s-\delta)*(n-1)$ bits by summing s bits representing an MCS value of a reference codeword and $(s-\delta)*(n-1)$ bits representing a difference between s and $\delta$ of the remaining n−1 codewords may be applied. The selection of the method of specifying the MCS according to the codewords may be independent of the selection of the HARQ process indication method. That is, during a single HARQ process, a single ACK/NACK information feedback method is applied to MCW SU-MIMO transmission and control information for specifying the MCS according to codewords may be signaled to a UE through an UL grant PDCCH.

All aspects of the present invention are applicable to direct transmission from a UE to an eNB, transmission from a UE to a relay node, between relay nodes, and from a relay node to an eNB in a state in which relay transmission is implemented, and control signaling.

Figure 11:
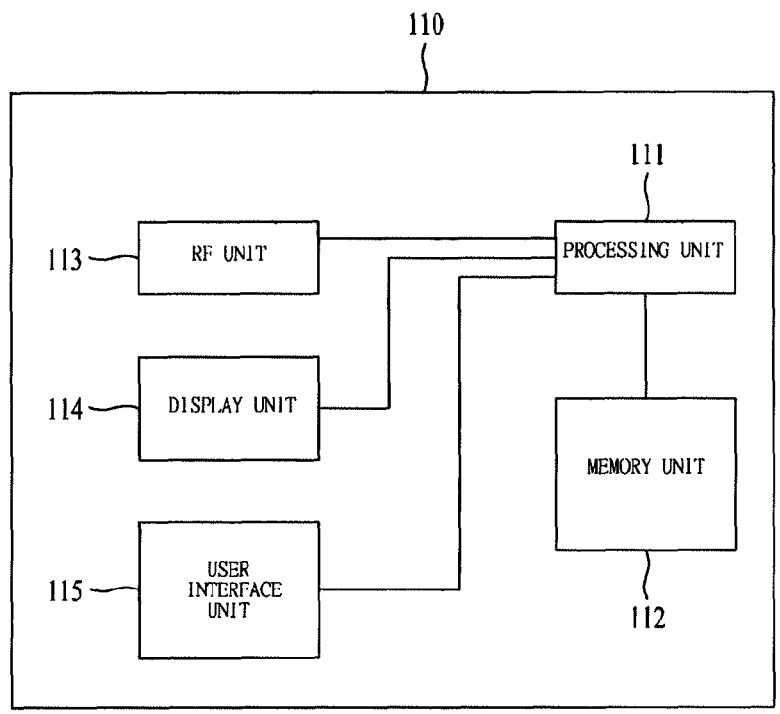
FIG. 11 is a block diagram showing the configuration of a device which is applicable to a UE and a BS and can perform the present invention.

FIG. 11 is a block diagram showing the configuration of a device that can perform the present invention and which is applicable to a user equipment (UE) and a base station (BS). As shown in FIG. 11, the device 110 includes a processing unit 111, a memory unit 112, a Radio Frequency (RF) unit 113, a display unit 114 and a user interface unit 115. Processing for a physical interface protocol layer is performed by the processing unit 111. The processing unit 111 provides a control plane and a user plane. Processing for each layer may be performed by the processing unit 111. The memory unit 112 may be electrically connected to the processing unit 111 and stores an operating system, application programs and general files. If the device 110 is a user equipment, the display unit 111 may display a variety of information and may be implemented using a Liquid Crystal Display (LCD) or an Organic Light Emitting Diode (OLED). The user interface unit 115 may be combined with a known user interface such as a keypad or a touch screen. The RF unit 113 may be electrically connected to the processing unit 111 so as to transmit or receive an RF signal.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with the terms user equipment (UE), mobile station (MS) or mobile subscriber station (MSS) as necessary.

The following embodiments of the present invention can be implemented by a variety of means, for example, hardware, firmware, software, or a combination thereof.

In the case of implementing the present invention by hardware, the present invention can be implemented using application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit is located inside or outside of the processor, so that it can communicate with the aforementioned processor via a variety of well-known parts.

The aforementioned embodiments are achieved by combination of structural elements and features of the present invention in a predetermined manner. Each of the structural elements or features should be considered selective unless specified otherwise. Each of the structural elements or features may be implemented without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Moreover, it will be apparent that some claims referring to specific claims may be combined with other claims referring to the other claims other than the specific claims to constitute the embodiment or new claims may be added by amendment after the application is filed.

The present invention is applicable to a user equipment, a base station or other device of a radio mobile communication system.

If Single-User Multiple Input Multiple Output (SU-MIMO) based on multiple codewords (MCW) is applied in uplink transmission, it is possible to reduce system complexity and to improve system management flexibility.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of generating an uplink reference signal in a Single-User Multiple Input Multiple Output (SU-MIMO) system for transmitting one or more codewords in uplink, the method comprising:

transmitting, at a base station, reference signal configuration information indicating the configuration of reference signals to be transmitted in uplink to a user equipment through a uplink grant Physical Downlink Control Channel (PDCCH), wherein the user equipment is set to operate according to an uplink access mode corresponding to the information; and receiving a subframe including the reference signals generated based on the reference signal configuration information from the user equipment, wherein the reference signal configuration information includes cyclic shift values of sequences of the reference signals, wherein the reference signal configuration information includes information about cyclic shifts of N (N≦M) reference signals among all M reference signals to be transmitted in uplink, and the information includes cyclic shift index of a reference signal used as a criterion among the N reference signals and offset information for determining cyclic shift indexes of remaining N−1 reference signals.

2. The method according to claim 1, wherein the reference signal configuration information includes cyclic shift indexes of N (N≦M) reference signals among all M reference signals to be transmitted in uplink.

3. The method according to claim 2, wherein the N reference signals are Constant Amplitude Zero Autocorrelaton (CAZAC) reference signals.

4. The method according to claim 2, wherein the N reference signals of the M reference signals are inserted at predetermined symbol positions of a time domain and are subjected to a Discrete Fourier Transform (DFT) process.

5. The method according to claim 2, wherein the N reference signals of the M reference signals are directly mapped to sample points corresponding to an allocated frequency transmission band at an input end of Inverse Discrete Fourier Transform (IDFT) or Inverse Fast Fourier Transform (IFFT).

6. The method according to claim 1, wherein M is determined according to a number of physical transmission antennas, physical transmission antennas or transmission layers of a subframe configured in the user equipment.

* * * * *